March 7, 1950 H. SELINGER 2,499,423

TELEPHONE TRANSMISSION CIRCUITS FOR COUPLING INPUT AND OUTPUT DEVICES TO A TELEPHONE LINE

Filed March 6, 1946

INVENTOR
HERBERT SELINGER
BY [signature]
ATTORNEY.

Patented Mar. 7, 1950

2,499,423

UNITED STATES PATENT OFFICE 2,499,423

TELEPHONE TRANSMISSION CIRCUITS FOR COUPLING INPUT AND OUTPUT DEVICES TO A TELEPHONE LINE

Herbert Selinger, Sydney, New South Wales, Australia, assignor to Hartford National Bank & Trust Company, Hartford, Conn., as trustee Application March 6, 1946, Serial No. 652,475
In Australia September 30, 1944

Section 1, Public Law 690, August 8, 1946
Patent expires September 30, 1964

7 Claims. (Cl. 179—170)

This invention relates to telephone transmission systems of the kind in which hybrid transformers are used and it is the primary object of the invention to provide thermionic vacuum tube circuits which may be used in lieu of the hybrid transformers.

According to the invention, a vacuum tube having suitable characteristics is provided with anode and cathode impedances, and a voltage dividing network comprising a plurality of impedances is connected between the anode and the cathode of the tube. The network should preferably have a relatively high impedance over the range of frequencies for which the telephone transmission system is designed.

In order that the invention may be more readily understood reference will now be made to the accompanying drawings in which.

Figure 1:
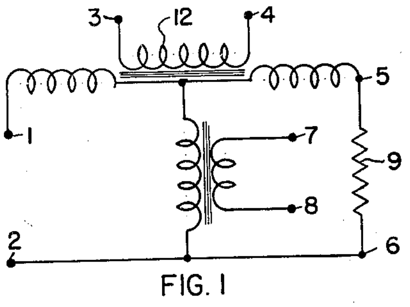
Figure 1 is a circuit diagram of a typical hybrid transformer such as is well known in the art.

Referring to Figure 1 of the drawings the numerals 1 and 2 indicate the terminals of a two-wire telephone circuit handling signals in both directions, 7 and 8 represent the terminals of two wires handling signals originating between the terminals 1 and 2 and leaving the transformer. 3 and 4 represent the terminals of a two-wire circuit feeding signals into the transformer which ultimately leave by the circuit connected to the terminals 1 and 2 and 5 and 6 indicate terminals across which is connected a terminating impedance 9. Alternatively another two-wire circuit may be connected to the terminals 5 and 6.

The circuit is arranged so that the following conditions are satisfied.

The impedance across the terminals 1 and 2 is equal to the impedance across the terminals 5 and 6; the transformer windings, 10 and 11 are made equal and are balanced with respect to the winding 12; and the impedances across the windings 10 and 11 are equal to the impedance across the primary winding of the transformer 13.

Under these conditions, no energy passes from the terminals 1 and 2 to the terminals 5 and 6 but energy is conveyed to the terminals 7 and 8 with a minimum loss of three decibels.

Energy from the terminals 3 and 4 is divided between the circuits connected to the terminals 1 and 2 and the terminals 5 and 6, the minimum loss to each pair of terminals being three decibels but no energy is transferred to the terminals 7 and 8. Energy applied to the terminals 7 and 8 will appear between the terminals 1 and 2 and the terminals 5 and 6 with a loss of three decibels but will not appear between the terminals 3 and 4.

Such a transformer has many applications. For example, the terminals 3 and 4 may be connected to a microphone and the terminals 7 and 8 to a telephone receiver. In such a circuit energy produced by the microphone will not reach the telephone receiver. In another application the terminals 7 and 8 may be connected to the input of an amplifier whose output is connected to the terminals 3 and 4. If another two-wire circuit is connected to the terminals 5 and 6, signals incoming to the terminals 1 and 2 will be applied in amplified form to the terminals 5 and 6. Similarly, incoming signals to the terminals 5 and 6 will be repeated in amplified form at the terminals 1 and 2. The limit of amplification possible depends upon the attenuation existing between the terminals 3 and 4 and the terminals 7 and 8. If this attenuation is exceeded by the amplifier gain, the circuit sings.

In practice, the use of a single hybrid transformer in combination with an amplifier has the disadvantage that the amplified signal is transmitted in the direction from which it is received in addition to the desired direction which may cause undesirable echoes in the circuit. It is therefore the practice to use two hybrid transformers and amplifiers, the terminals 7 and 8 of one transformer feeding an amplifier the output of which is connected to the terminals 3 and 4 of the other transformer. With such an arrangement, signal energy is transmitted only in the desired direction and the attenuation around the complete circuit is the sum of the attenuation of the two hybrid transformers.

Considerable difficulty is experienced in manufacturing hybrid transformers in which the necessary balancing and equalization of impedances is attained for all frequencies and it is usually necessary to incorporate filters in the circuits to eliminate the frequencies at which balanced conditions do not exist.

This invention provides means whereby the properties of a hybrid transformer can be obtained with a higher degree of balance over a wider range of frequencies than can be obtained by the use of the usual hybrid transformer.

Figure 2:
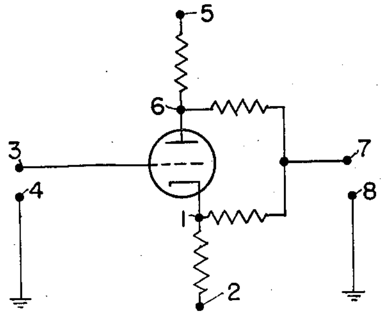
Figure 2 is a circuit diagram of a simple embodiment of the invention.

In Figure 2 of the drawings, in which a simple embodiment of the invention is shown, a thermionic vacuum tube is used in lieu of numerals 1 to 8 inclusive indicating like terminals to those of Figure 1.

The circuit components of Figure 2 are selected so that the ratio of the impedance between the terminals 1 and 2 to that between the terminals 5 and 6 is equal to the ratio of the impedance between the terminals 1 and 7 to the impedance between the terminals 7 and 6. If this ratio is established a signal applied between the terminals 3 and 4 will not appear across the terminals 7 and 8 but will appear across the terminals 5 and 6 and the terminals 1 and 2.

A signal across terminals 7 and 8 will appear across the terminals 5 and 6 and the terminals 1 and 2 whilst a signal applied between the terminals 5 and 6 will appear at the terminals 7 and 8 and the terminals 1 and 2 via the circuit impedances. The attenuation between the terminals is determined by the values of components.

Figure 3:
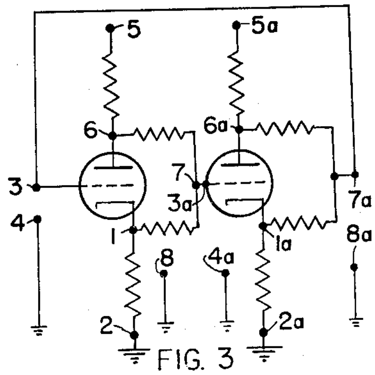
Figure 3 is a circuit diagram similar to that of Figure 2 but illustrating the use of two vacuum tubes.

Figure 3 illustrates the combination of two vacuum tube circuits as illustrated in Figure 2 to perform the functions of two hybrid transformers and amplifiers such as are commonly used. The reference numerals have the same significance as in the previous figures except that the suffix "*a*" has been combined with the numerals relating to the additional tube circuit. It will be apparent from the figure that the terminals 7 and 8 are connected to the terminals 3*a* and 4*a* and that the terminals 7*a* and 8*a* are connected to the terminals 3 and 4.

In the arrangement shown in Figure 3 if a signal is applied between the terminals 1 and 2, it will be repeated by the first vacuum tube across the terminals 7 and 8. The other vacuum tube will then repeat it across the terminals 1*a* and 2*a*. However, the latter tube will not repeat it to the terminals 7*a* and 8*a*, and thus the singing potentials are attenuated. Similary, a signal applied across the terminals 1*a* and 2*a* will be repeated across the terminals 7*a* and 8*a* and then applied across the terminals 3 and 4 of the first mentioned vacuum tube which will repeat it across the terminals 1 and 2 but not across the terminals 7 and 8. Consequently, the singing potentials are again attenuated. The total gain from the terminals 1 and 2 to the terminals 1*a* and 2*a* in decibels is the sum of the gain in decibels in each stage whilst the attenuation is the sum of the loss in decibels between the terminals 3 and 4 and the terminals 7 and 8 in each stage.

If desired, additional amplifiers may be connected between the terminals 7 and 8 and the terminals 3*a* and 4*a* and also between the terminals 7*a* and 8*a* and the terminals 3 and 4, the limit of gain being determined by the degree of attenuation. If more gain is required than can be obtained without exceeding this limit a number of pairs of vacuum tubes may be connected in cascade. Some of the possible applications of such a cascade connection are hereinafter described.

The simple circuit illustrated in Figure 2 resembles the well known phase splitting vacuum tube circuit often employed in push-pull audio frequency amplifiers. The gain from the terminals 3 and 4 to the terminals 1 and 2 cannot exceed unity because of the negative feedback existing across the cathode impedance 1, 2. The gain from the terminals 1 and 2 to the terminals 5 and 6 is determined, in the main, by the mutual conductances of the tube and the impedance between the terminals 5 and 6. This impedance is affected by the impedance between the terminals 6 and 7 and that between the terminals 7 and 8, and also by the impedances and reactions of the impedances between the terminals 7 and 1. If the impedance between the terminals 7 and 8 is relatively high, e. g. it comprises the input to an amplifier, it may be neglected, and such a condition is assumed. Nevertheless, the invention is not intended to be restricted to the use of a high impedance between the terminals 7 and 8.

If the impedance between the terminals 7 and 8 is regarded as being extremely high the impedances between the terminals 6 and 7 and the terminals 7 and 1 may be made high with respect to the impedance between the terminals 5 and 6.

Denoting the impedance between the terminals 5 and 6 by the symbol $Za$, that between the terminals 6 and 7 by the symbol $Zb$, that between the terminals 7 and 1 by the symbol $Zc$ and that between the terminals 1 and 2 by the symbol $Zd$, to gain to the different pairs of terminals from the terminals 1 and 2 is approximately as follows, assuming that a pentode vacuum tube is used as the amplifier:

To terminals 5 and 6 ........ $G_m.Z_a$

To terminals 7 and 8 ........ $\dfrac{(G_m.Z_a-1)Z_c}{Z_c+Z_b}+1$

However, the condition exists that $Z_a/Z_d=Z_b/Z_c$ so that, when a signal is applied between the terminals 3 and 4, no energy appears across the terminals 7 and 8.

Hence the gain from the terminals 1 and 2 to the terminals 7 and 8 is given by:

$$\frac{(G_mZ_a-1)Z_d}{Z_d+Z_a}+1$$

The ratio of the gain from the terminals 1 and 2 to the terminals 7 and 8 to that from the terminals 3 and 4 to the terminals 1 and 2 is therefore the value given by the last mentioned equation and this may be reduced to unity, or even inverted by modifications to the feedback properties of the circuit. At the same time, the input impedance between the terminals 1 and 2 may be controlled.

The input impedance between the terminals 1 and 2 consists of the cathode impedance between the terminals 1 and 2 in parallel with the impedance of the tube circuit as viewed from these terminals. The impedance of the tube is approximately equal to $(R_a+Z_a)\mu$ where $R_a$ is the internal resistance and $\mu$ is the amplification factor of the tube.

As a result of the ultimate connection of the control grid to the earthy end of the cathode impedance which produces negative feedback effects.

The effective tube resistance and the gain from the terminals 3 and 4 to the terminals 1 and 2 may be increased at the expense of a reduction in gain between the terminals 1 and 2 and the terminals 7 and 8 by connecting the circuit normally feeding the terminals 3 and 4 to a point on the cathode resistor between the terminals 1 and 2 or by applying positive feedback to the tube to partially neutralize the negative feedback. From one viewpoint, both these connections are identical. In each, the negative feedback is partially cancelled.

Figure 4:
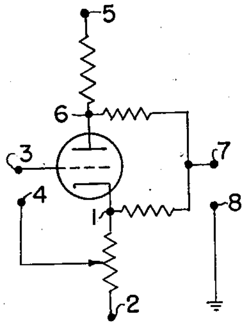
Figure 4 is a modification of the circuit of Figure 2.

Figure 4 shows a modification of the circuit of Figure 2 in which the input circuit terminals 3 and 4 are connected to the grid and a tap on the resistance between the terminals 1 and 2 instead of between the grid and the low potential terminal 2. In this circuit the application of a signal to the terminals 3 and 4 will produce an output between the terminals 1 and 4 with a gain of slightly less than unity (if the impedances concerned are of suitable magnitude with respect to the mutual conductances of the tube) and the total output voltage between the terminals 1 and 2 will be the value of this voltage plus the voltage developed between the terminals 4 and 2. The anode cathode current of the tube traverses both portions of the resistance between the terminals 1 and 2 and the gain to the terminals will be approximately equal to the ratio of the resistance between the terminals 1 and 2 to the resistance between the terminals 1 and 4. Hence, the gain in this direction has been increased.

On the other hand, if a signal is applied to the terminals 1 and 2 the total input voltage will not be applied to the grid of the tube but only that portion of the voltage across the resistance between terminals 1 and 4. The gain of the circuit from the terminals 1 and 2 to the terminals 7 and 8 will therefore be reduced by an amount equal to the ratio of the impedance between the terminals 1 and 4 to the whole impedance between the terminals 1 and 2. The effective value of these impedances is affected by the effective internal resistance of the tube as modified by the negative feedback.

It is evident from the foregoing that the circuit shown in Figure 4 enables the ratio between the two gains of the circuit to be adjusted making the input impedance between the terminals 1 and 2 dependent on this ratio. Alternatively, the input impedance may be adjusted so that the ratio between the two gains is a result of the adjustment.

Figure 5:
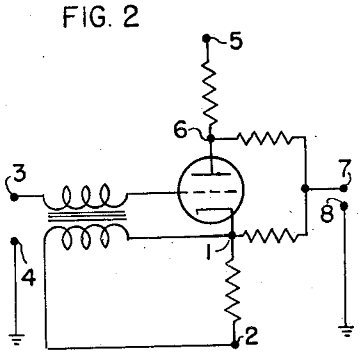
Figure 5 is a modified form of the circuit shown in Figure 4.

The circuit of Figure 4 has the disadvantage that the terminal 4 is not at earth potential. Figure 5 illustrates a circuit in which the terminal 4 remains at earth potential. The numeral 14 denotes a transformer which injects into the grid circuit potentials originally introduced into the cathode circuit. It should be noted that this transformer does not couple the cathode circuit to the circuit connected to the terminals 3 and 4 because the potentials developed in its secondary winding are applied to this circuit in series with the grid cathode impedance of the tube which may be regarded as infinitely large.

The functioning of the circuit of Figure 5 is determined by the phase and magnitude of the potentials injected into the grid circuit. If the phase is opposite to that of the potentials applied between the terminals 1 and 2 which are injected into the grid circuit via the earthed terminal 4 and the input circuit between the terminals 3 and 4 the feedback will be positive. If the potentials are opposite in phase and are of equal magnitude to the potentials applied between the terminals 1 and 2, signals applied to the cathode circuit across the terminals 1 and 2 will produce no change in the potential between the grid and cathode. Furthermore the only potentials evident at the terminals 7 and 8 will be those passing to these terminals via the various impedances and thus their value does not depend upon the repeating action of the tube. On the other hand, the gain from the terminals 3 and 4 to the terminals 1 and 2 will be the product of the tube mutual conductance and the impedance between the terminals 1 and 2. The input impedance between the terminals 1 and 2 will be the impedance between the terminals 1 and 2 with the tube inoperative, in parallel with the internal resistance of the tube in series with the impedance between the terminals 5 and 6.

Any intermediate condition between that of the circuit of Figure 2 and that just described can be obtained by making the ratio between the potentials across the secondary winding of transformer 14 and those between the terminals 1 and 2 a suitable value less than unity. If this ratio is made greater than unity a regenerative condition will exist which will increase the gain in all directions but may cause instability. If the phase of the potentials in the secondary winding of the transformer is changed 180 degrees, the gain from the terminals 3 and 4 to the terminals 1 and 2 will be reduced to less than unity, the effective input impedance between the terminals 1 and 2 will be still further reduced and the gain between the terminals 1 and 2 and the terminals 7 and 8 will be increased. These effects will not affect the attenuation between the terminals 3 and 4 and the terminals 7 and 8 in any material manner.

Figure 6:
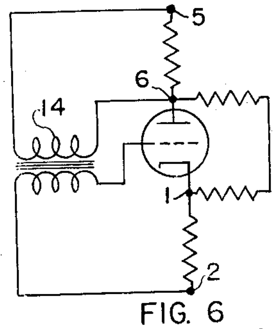
Figure 6 is the circuit diagram of a still further modification of the invention.

Somewhat similar effects may be obtained by the circuit shown in Figure 6 where the transformer 14 is connected in such manner that signals are injected into the grid circuit from across the terminals 5 and 6. This connection can reduce the negative feedback, which limits the gain from the terminals 3 and 4 to the terminals 1 and 2, by applying positive feedback. Alternatively, it can reduce the gain by applying negative feedback in a manner which resembles that described in connection with Figure 5. However, in the circuit of Figure 6 the gain from the terminals 1 and 2 to the terminals 7 and 8 can also be controlled by degeneration to a value less than unity. This gain is mainly dependent upon the production of gain between the terminals 1 and 2 and the terminals 5 and 6. Negative feedback of the nature provided by the circuit of Figure 6, represents current feedback so far as the signal applied between the terminals 1 and 2 is concerned. The input impedance between the terminals 1 and 2 can therefore be made equal to the actual impedance between the terminals 1 and 2 in parallel with the effective impedance of the tube which is increased by the feedback.

The circuit shown in Figure 6 also has the property of repeating in the cathode circuit by tube action signals applied to the terminals 5 and 6. Hence the terminals 5 and 6 may be connected to another two wire circuit just as the terminals 5 and 6 of Figure 1 may be connected to another line. Furthermore, if a signal is applied to the terminals 3 and 4, it will be repeated in both the external circuits connected respectively to the terminals 1 and 2 and terminals 5 and 6, without being repeated at the terminals 7 and 8. In addition a signal may be applied to the terminals 7 and 8 and it will be repeated by tube action (although first attenuated by the impedances present) at the terminals 5 and 6 and the terminals 1 and 2 but will not be repeated at the terminals 3 and 4. This circuit therefore more closely resembles that of the transformer of Figure 1 than does the circuit of Figure 2. An amplifier may be connected in circuit between the terminals 7 and 8 and fed to the terminals 3 and 4 in which case the amplifier amplifies signals passing in both directions between the terminals 1 and 2 and the terminals 5 and 6. As will be seen this circuit has a marked advantage in applications other than that of a hybrid.

In hybrid transformers and in the vacuum tube circuits as herein described, the attenuation is mainly dependent upon the equalizing of the impedances between the terminals 1 and 2 and the terminals 5 and 6. In practice, one of these impedances at least will be a transmission line with a complex impedance which is difficult to match by artificial means.

Figure 7:
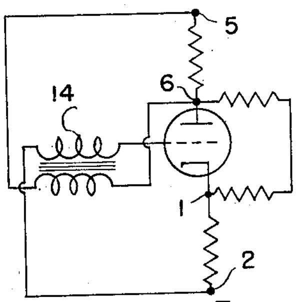
Figure 7 is a modification of the circuit of Figure 6.

Figure 7 depicts a modification of the circuit of Figure 6 which can be inserted between a transmission line and a hybrid transformer or other device to isolate the device from the reactances of the line.

Figure 8:
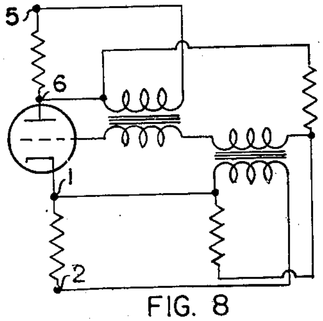
Figure 8 is a simple variation of the circuits shown in Figures 6 and 7.

In Figure 7, if a line is connected across the terminals 1 and 2 and a similar line is connected across the terminals 5 and 6, signals from one line will be repeated in the other and vice versa. The impedance across the terminals for the incoming signal will appear to the terminals for the outgoing signal in series with the tube internal resistance which can be controlled in complementary manner in both directions by means of negative current and voltage feedback. The negative feedback may, in turn, be controlled by positive feedback if desired by means of transformers whose secondary windings are connected in the grid circuit of the tube. The transformer primary windings may be fed from potentiometers or the secondary windings may feed potentiometers to simplify adjustment in the grid circuit. Figure 8 represents a simple variation of the circuits of Figures 6 and 7 suitable for this application. The impedances between the terminals 7 and 6 and the terminals 7 and 1 may be made extremely high. If a signal potential is applied to the terminals 1 and 2, it will produce a change in the potential between the cathode and the grid of the tube and will be repeated at the terminals 5 and 6. The reverse is also the case. Any negative feedback effects which lower the effective impedance of the tube can be neutralized by means of transformers injecting feedback into the grid circuit.

If desired, positive feedback may be injected into the circuits herein described where it appears to be desirable or alternatively negative feedback may be increased or injected by means of phase changing tubes in lieu of transformer if such is more convenient for particular purposes. Such circuits are well known to those skilled in the art and do not require elaboration.

Figure 9:
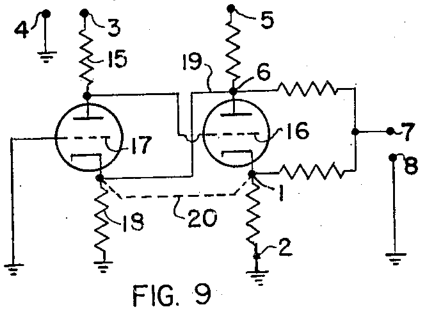
Figure 9 is a circuit diagram of a further embodiment of the invention.

It has been previously mentioned that phase reversing vacuum tube circuits may be used in lieu of transformers to inject potentials in series with the input terminals 3 and 4 and the grid in circuits such as those shown in Figures 5, 6, 7 and 8. Figure 9 illustrates one method of doing this. Blocking condensers have been omitted from the figure for the sake of simplicity.

The terminals 3 and 4 are connected in series with a resistor 15 coupled to the grid of the tube 16. This resistor forms the anode load of an auxiliary tube 17, the grid of which is coupled to ground.

If a connection 19 is made between the anode of the tube 16 and the cathode of tube 17, with a resistor 18 connected from the cathode of tube 17 to ground, variation of the anode potential of tube 16 will be injected in series with its grid in a degenerative manner. The result is the equivalent of the circuit of Figure 7, with the proper phasing for the production of negative feedback. If the connection 19 is removed and the connection 20 shown by a dotted line is inserted, the result is the equivalent of the circuit of Figure 5 with phasing such that the feedback is from the cathode circuit and is positive.

Figure 10:
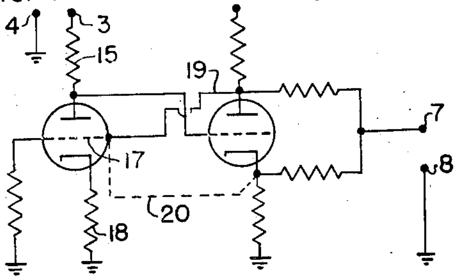
Figure 10 is a similar circuit to that of Figure 9.

Figure 10 is a similar circuit to that of Figure 9 in which an impedance is included between the grid of the tube 17 and ground. A connection 19 between the anode of the tube 16 to the grid of the tube 15 as shown will result in positive feedback equivalent to the circuit of Figure 6. Removal of this connection and the substitution of the connection shown in dotted lines provides a circuit equivalent to that of Figure 5 with phasing for the production of negative feedback. Resistors or attenuators may be introduced into these connections as desired to control the magnitude of the feedback effect. It will be clear to those skilled in the art that the circuits of Figures 9 and 10 may be combined to produce a circuit equivalent to that of Figure 8 so that the use of transformers is avoided. Preferably, the tube 17 should have a relatively high internal impedance.

A practical example of the invention will now be given as applied to a telephone system in which it is desired to use the same electromagnetic acoustic transducer for both the microphone and the loudspeaker in a two-way telephone system.

A number of circuits such as those illustrated in Figure 3 or as described in connection with Figure 1 are connected in cascade between two transducers. Circuits such as those described in connection with Figures 7 and 8 may be included in order to assist in obtaining the matching of impedances so that a large attenuation to singing currents is obtained in each hybrid circuit. By these means sufficient attenuation and gain may be obtained to enable speech introduced at one end to be reproduced at the other without singing and hence two way conversation can be carried on with one transducer at each terminal of the system.

Having now described my invention, what I claim as new and desire to secure by Letters Patent is:

1. In a telephone system, apparatus for coupling input and output devices to a telephone line, said apparatus comprising a phase inverting amplifier including an electron discharge tube having a cathode, a control grid and an anode and circuits therefor, a first impedance in the cathode circuit and a second impedance in the anode circuit; a voltage dividing impedance element connected between said anode and said cathode; means to couple said line across said first impedance; means to couple said input device between said control grid and a predetermined point in said first impedance; and means to couple said output device between a predetermined point in said element and the end of said first impedance remote from said cathode.

2. In a telephone system, apparatus for coupling input and output devices to a telephone line, said apparatus comprising a phase inverting amplifier including an electron discharge tube having a cathode, a control grid and an anode and circuits therefor, a first impedance in the cathode circuit and a second impedance in the anode circuit; a voltage dividing impedance element connected between said anode and said cathode; means to couple said line across said first impedance; means to couple said input device between said control grid and a predetermined point in said first impedance; and means to couple said output device between a predetermined point in said element and the end of said first impedance remote from said cathode, said first and second impedances and said element having respective values at which the ratio of the first impedance to the second impedance is substantially equal to the ratio of the impedance of said element between the point therein and the cathode and the impedance of said element between the point therein and the anode.

3. In a telephone system, apparatus for coupling input and output devices to a telephone line, said apparatus comprising a phase inverting amplifier including an electron discharge tube having a cathode, a control grid and an anode and circuits therefor, a first impedance in the cathode circuit and a second impedance in the anode circuit; a voltage dividing impedance element connected between said anode and said cathode; means to couple said line across said first impedance; means to couple said input device between said control grid and the end of said first impedance remote from said cathode; means to couple said output device between a predetermined point in said element and said remote end of said first impedance; said first and second impedances and said element having respective values at which the ratio of the first impedance to the second impedance is substantially equal to the ratio of the impedance of said element between the point therein and the cathode and the impedance of said element between the point therein and the anode.

4. In a telephone system, apparatus for coupling input and output devices to a telephone line, said apparatus comprising a phase inverting amplifier including an electron discharge tube having a cathode, a control grid and an anode and circuits therefor, a first impedance in the cathode circuit, said first impedance having an adjustable tap, and a second impedance in the anode circuit; a voltage dividing impedance element connected between said anode and said cathode; means to couple said line across said first impedance; means to couple said input device between said control grid and said adjustable tap; and means to couple said output device between a predetermined point in said element and the end of said first impedance remote from said cathode.

5. In a telephone system, apparatus for coupling input and output devices to a telephone line, said apparatus comprising a phase inverting amplifier including an electron discharge tube having a cathode, a control grid and an anode and circuits therefor, a first impedance in the cathode circuit, said first impedance having an adjustable tap, and a second impedance in the anode circuit; a voltage dividing impedance element connected between said anode and said cathode; means to couple said line across said first impedance; means to couple said input device between said control grid and said adjustable tap; and means to couple said output device between a predetermined point in said element and the end of said first impedance remote from said cathodes; said first and second impedance and said element having respective values at which the ratio of the first impedance to the second impedance is substantially equal to the ratio of the impedance of said element between the point therein and the cathode and the impedance of said element between the point therein and the anode.

6. In a telephone system, apparatus for coupling input and output devices to a telephone line, said apparatus comprising a phase inverting amplifier including an electron discharge tube having a cathode, a control grid and an anode and circuits therefor, a first impedance in the cathode circuit and a second impedance in the anode circuit; a transformer having a primary and a secondary, said primary being connected in parallel with one of said impedances, a voltage dividing impedance element connected between said anode and said cathode, means to couple said line across said first impedance; means to couple said input device between said control grid via said secondary and the end of said first impedance remote from said cathode; and means to couple said output device between a predetermined point in said element and said remote end of said first impedance.

7. In a telephone system, apparatus for coupling input and output devices to a telephone line, said apparatus comprising a phase inverting amplifier including an electron discharge tube having a cathode, a control grid and an anode and circuits therefor, a first impedance in the cathode circuit and a second impedance in the anode circuit; a transformer having a primary and a secondary, said primary being connected in parallel with said first impedance; a voltage dividing impedance element connected between said anode and said cathode; means to couple said line across said first impedance; means to couple said input device between said control grid via said secondary and the end of said first impedance remote from said cathode; and means to couple said output device between a predetermined point in said element and said remote end of said first impedance; said first and second impedances and said element having respective values at which the ratio of the first impedance to the second impedance is substantially equal to the ratio of the impedance of said element between the point therein and the cathode and the impedance of said element between the point therein and the anode.

HERBERT SELINGER.

REFERENCES CITED

The following references are of record in the file of this patent:

UNITED STATES PATENTS

| Number | Name | Date |
|---|---|---|
| 2,012,286 | Peterson | Aug. 27, 1935 |
| 2,411,706 | Berkoff | Nov. 26, 1946 |
| 2,441,334 | Sayer | May 11, 1948 |